(12) United States Patent
Quenzi

(10) Patent No.: US 10,596,948 B2
(45) Date of Patent: Mar. 24, 2020

(54) HYDRAULICALLY-ADJUSTABLE ELASTOMERIC VEHICLE SUSPENSION SYSTEM

(71) Applicant: Davis Village Solutions, LLC, Baraga, MI (US)

(72) Inventor: Philip J. Quenzi, Atlantic Mine, MI (US)

(73) Assignee: DAVIS VILLAGE SOLUTIONS, LLC, Baraga, MI (US)

( * ) Notice: Subject to any disclaimer, the term of this patent is extended or adjusted under 35 U.S.C. 154(b) by 274 days.

(21) Appl. No.: 15/689,272

(22) Filed: Aug. 29, 2017

(65) Prior Publication Data

US 2018/0056840 A1     Mar. 1, 2018

Related U.S. Application Data

(60) Provisional application No. 62/381,042, filed on Aug. 30, 2016.

(51) Int. Cl.
| | | |
|---|---|---|
| *B60P 1/00* | (2006.01) | |
| *B60P 1/16* | (2006.01) | |
| *B60G 13/00* | (2006.01) | |
| *B60G 15/06* | (2006.01) | |
| *B60P 1/02* | (2006.01) | |
| *B60P 1/28* | (2006.01) | |

(52) U.S. Cl.
CPC ............ *B60P 1/162* (2013.01); *B60G 13/005* (2013.01); *B60G 15/06* (2013.01); *B60P 1/025* (2013.01); *B60G 2202/14* (2013.01); *B60G 2202/143* (2013.01); *B60G 2202/24* (2013.01); *B60G 2202/413* (2013.01); *B60G 2300/04* (2013.01); *B60P 1/28* (2013.01)

(58) Field of Classification Search
CPC .. B60P 1/162; B60P 1/025; B60P 1/28; B60G 13/005; B60G 15/06; B60G 2202/14; B60G 2202/143; B60G 2202/24; B60G 2202/413; B60G 2300/04
USPC ....................................... 280/6.151
See application file for complete search history.

(56) References Cited

U.S. PATENT DOCUMENTS

| | | |
|---|---|---|
| 3,071,382 A | 1/1963 | De Biasi |
| 4,167,891 A * | 9/1979 | Kamimura ............ F15B 15/261 91/408 |
| 6,131,830 A | 10/2000 | Jones |
| 6,698,997 B2 | 3/2004 | Arne et al. |

(Continued)

*Primary Examiner* — Ruth Ilan
*Assistant Examiner* — Hilary L Johns
(74) *Attorney, Agent, or Firm* — Honigman LLP

(57) ABSTRACT

A suspension system for a vehicle includes an extendable and retractable actuator disposed at each side of a frame of the vehicle and pivotally attached at one end to a vehicle bracket and at the other end to a suspension bracket. The suspension bracket includes an actuator portion, an axle portion and a suspension arm, with the actuator portion and the suspension arm pivotable relative to an axis of the axle portion. When the actuator is extended or retracted, the actuator portion pivots about the axis of the axle portion and imparts pivotal movement of a suspension arm about the axis to adjust a height of the frame of the vehicle. The actuator includes an elastomeric element disposed between an outer end of a slide rod and an outer end of a ram rod, with the slide rod movable to absorb sudden movements of the frame or wheel.

19 Claims, 10 Drawing Sheets

(56) References Cited

U.S. PATENT DOCUMENTS

| | | |
|---|---|---|
| 7,104,478 B2 | 9/2006 | Niemela et al. |
| 7,293,723 B2 | 11/2007 | Niemela et al. |
| 8,197,175 B2 | 6/2012 | Stewart et al. |
| 8,647,044 B2 | 2/2014 | Stewart et al. |
| 2012/0020762 A1* | 1/2012 | Roose .................... B60P 1/025 414/495 |
| 2014/0167372 A1* | 6/2014 | Kim .................. B60G 17/0157 280/6.157 |
| 2017/0008441 A1 | 1/2017 | Quenzi et al. |

* cited by examiner

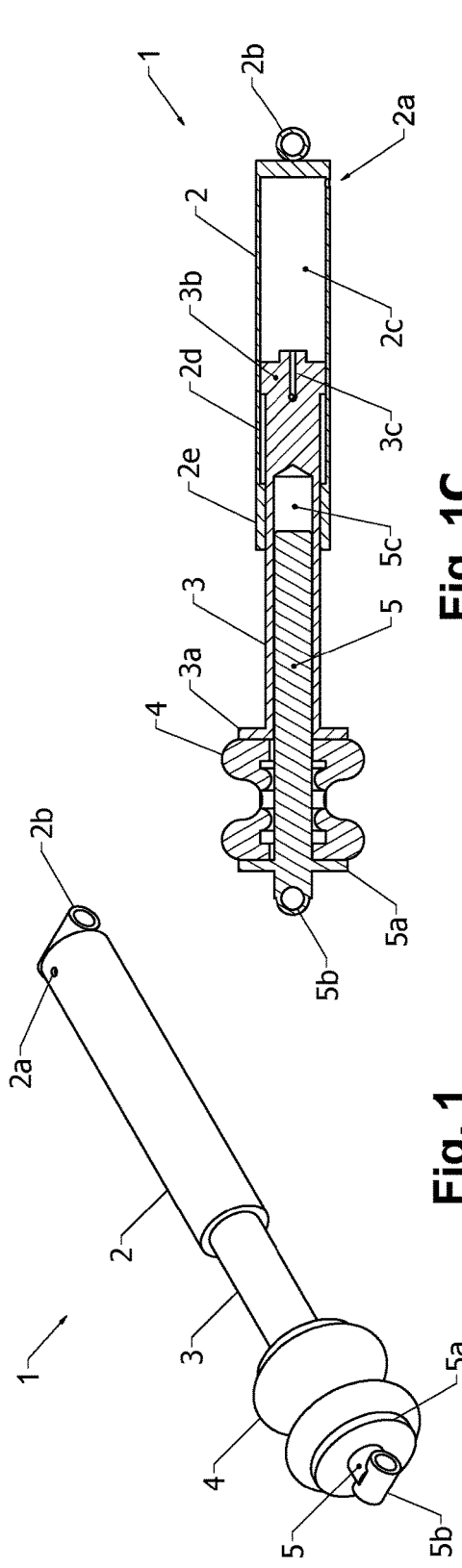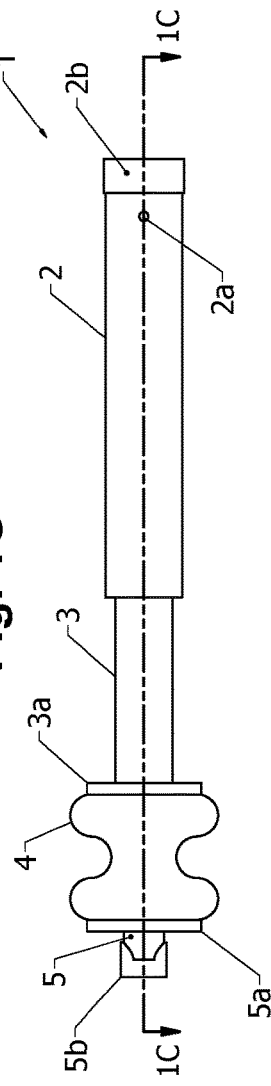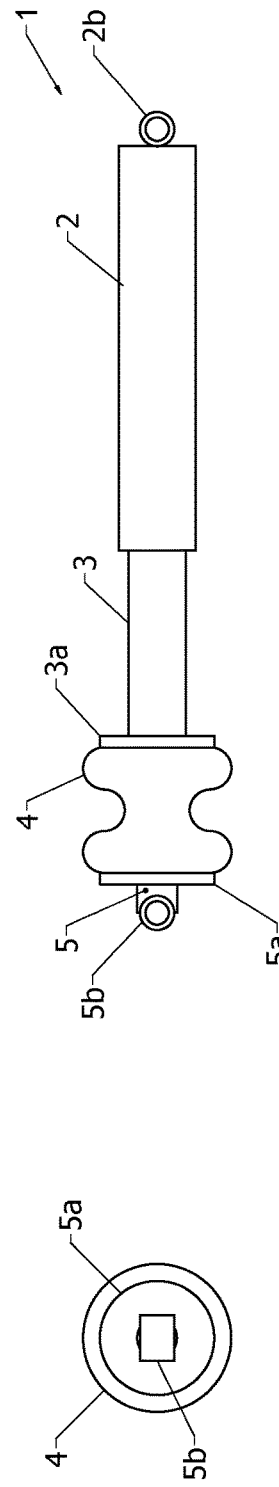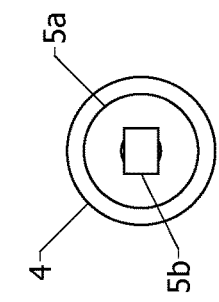

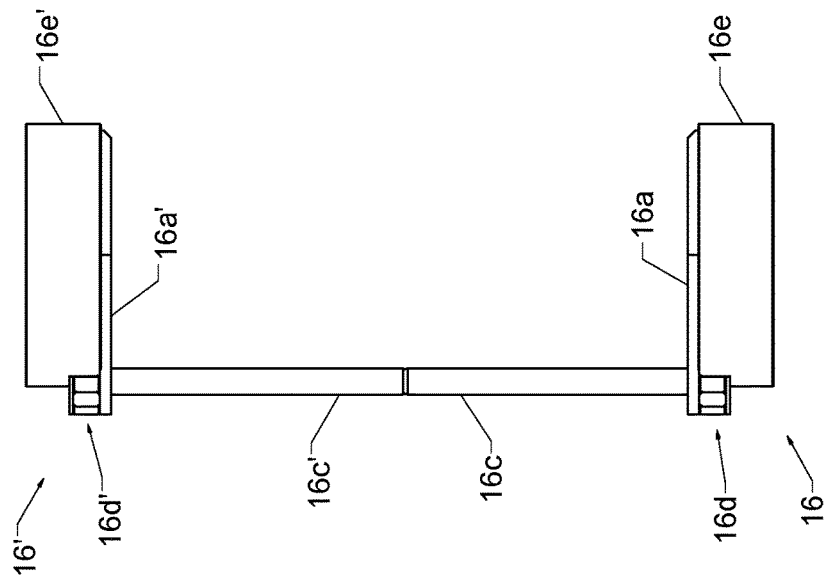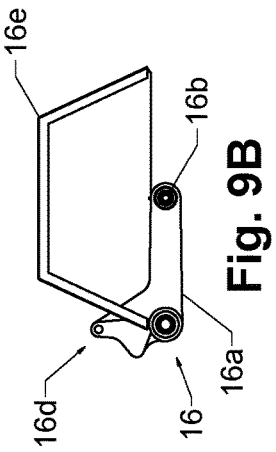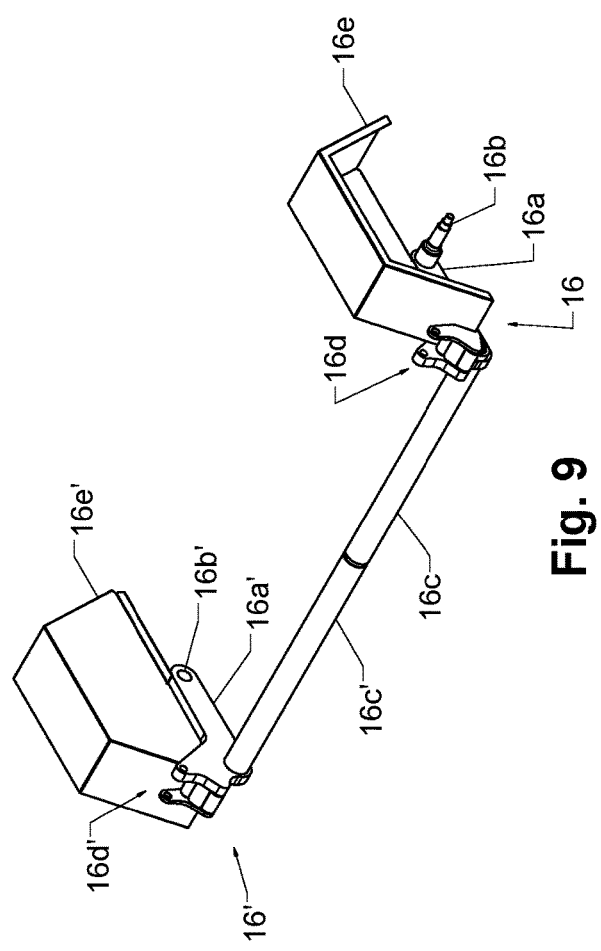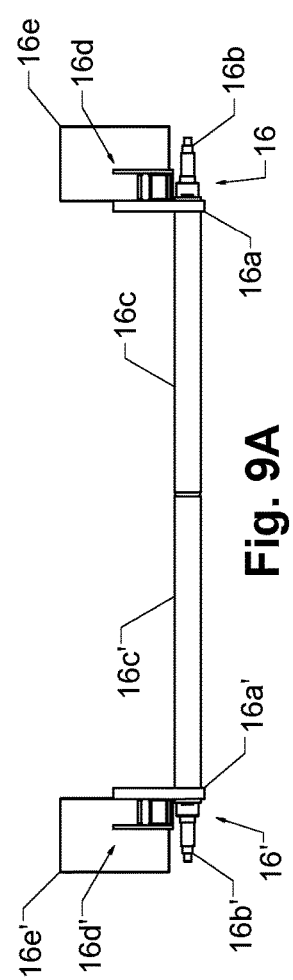
Fig. 9
Fig. 9B
Fig. 9A
Fig. 9C

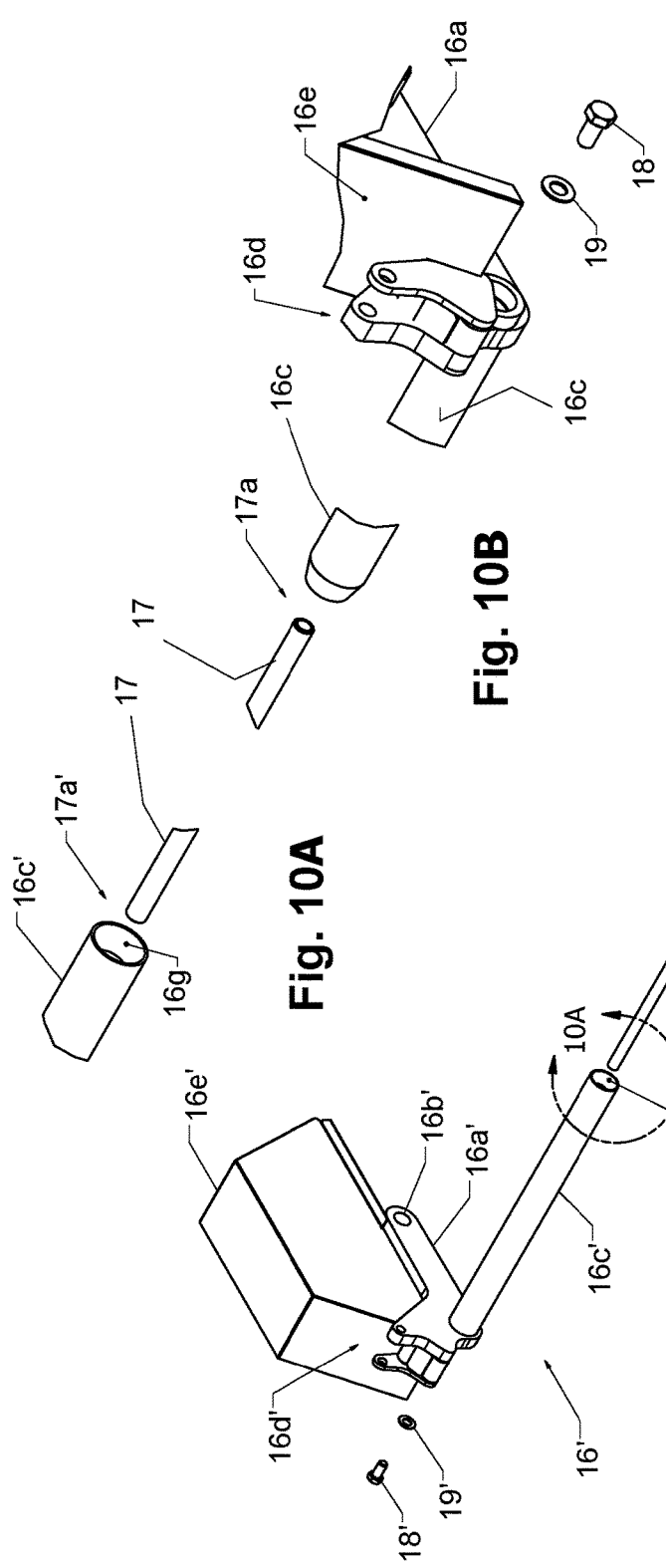
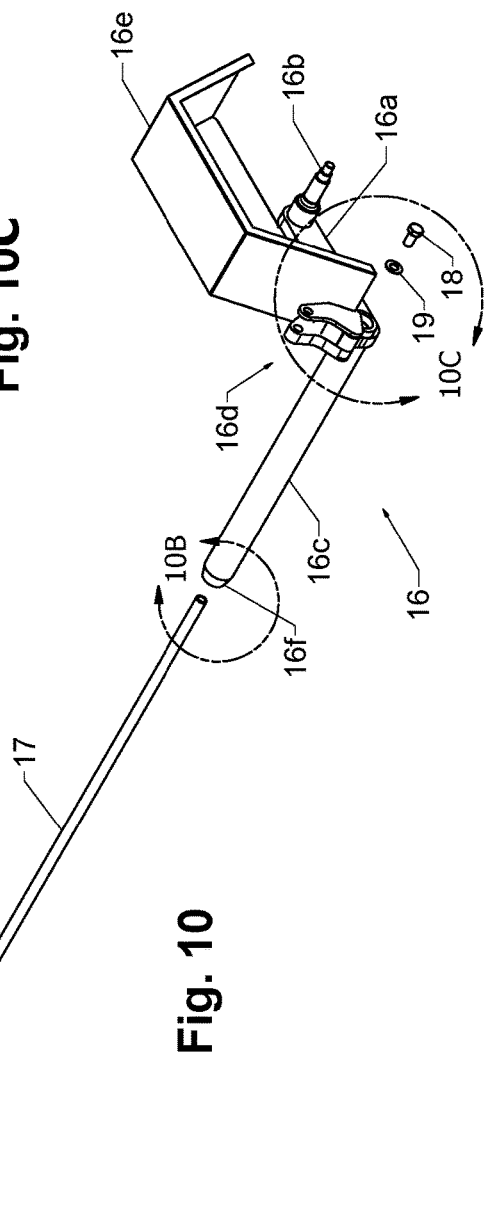

HYDRAULICALLY-ADJUSTABLE ELASTOMERIC VEHICLE SUSPENSION SYSTEM

CROSS REFERENCE TO RELATED APPLICATION

The present application claims the filing benefits of U.S. provisional application Ser. No. 62/381,042, filed Aug. 30, 2016, which is hereby incorporated herein by reference in its entirety.

FIELD OF THE INVENTION

The present invention relates generally to the field of ride-height adjustable suspension members and system for vehicle and/or trailer applications.

BACKGROUND OF THE INVENTION

It is generally known to provide various types of vehicle suspension members and suspension systems to both raise and lower a vehicle with respect to its operational ride-height above the ground. The particular purposes for such an arrangement can vary considerably. Applications may generally include for example, temporarily raising and lowering a utility trailer or vehicle for the purposes of loading and unloading of materials, temporarily lowering of a ground vehicle for improved high-speed stability and performance handling characteristics, and temporarily raising a ground vehicle for improve ride-height clearances over obstacles or rough terrain. Similarly, it is known to provide various powered and automated methods of ride-height adjustment of suspension systems including for example, manual mechanical adjustments of suspension members, pneumatic airbags or air-spring systems, and hydraulic or pneumatic actuator arrangements. Many of these known systems and suspension design arrangements may tend to require relatively complex electromechanical control systems and hardware including electronic micro-computer processors, inputs from a potential variety of sensors and output control means leading to the further disadvantage of increased complexity and cost.

SUMMARY OF THE INVENTION

The present invention provides a simplified and remotely adjustable ride-height suspension member assembly that, when incorporated for mechanized operation with a uniquely adapted pivoting-arm wheel support member, tends to offer both simplicity and low-cost effectiveness by virtue of its straight-forward structural and mechanical design. In its current form and for the sake of example, the system of the present invention is incorporated into a flat-bed utility trailer that is adapted to be tilted when loading and unloading materials as described herein. The utility trailer includes a trailer frame that is supported by at least one pair of left and right hand independent wheel and suspension assemblies. The upper surface or load-carrying portion of the trailer bed is incorporated within the trailer frame to define an upper support surface of the trailer bed.

One current embodiment and useful application of the present invention relates, for example, to tilt-bed utility trailers with beds that are adapted to be readily lowered or otherwise tilted to near ground level to ease and facilitate the loading and unloading of materials and items to and from the rearward most end of the utility trailer. The present invention readily provides for a utility trailer bed to be easily lowered or tilted to ground level and then easily raised again to normal ride height for transport and roadway travel. While the availability and use of tilt-bed utility trailers is generally known, this example serves to illustrate the functional benefits and usefulness of the present invention. It should be understood that the present invention as generally described and introduced herein, may be readily adapted to a potentially wide variety of suspension applications of involving vehicles, mobile equipment, and transportation applications and uses.

Thus, the present invention offers a relatively simple, effective and relatively low cost alternative solution as compared to any typically complex and costly ride-height adjustable suspension systems and similar applications that are currently available.

These and other objects, advantages, purposes and features of the present invention will become apparent upon review of the following specification in conjunction with the drawings.

BRIEF DESCRIPTION OF THE DRAWINGS

FIG. 1 is a three-quarter left-front upper perspective view of a hydraulically-adjustable elastomeric suspension unit assembly for a tilt-bed utility trailer in accordance with one embodiment of the present invention;

FIG. 1A is a side view of the hydraulically-adjustable elastomeric suspension unit assembly of FIG. 1;

FIG. 1B is a top view of the hydraulically-adjustable elastomeric suspension unit assembly of FIG. 1A;

FIG. 1C is a cross-section view of the hydraulically-adjustable elastomeric suspension unit assembly, taken along the line 1C-1C in FIG. 1B;

FIG. 1D is an end view of the hydraulically-adjustable elastomeric suspension unit assembly of FIG. 1;

FIG. 9 is a three-quarter left front view of the left and right hand side wheel support member sub-assemblies;

FIG. 9A is a front view of the three-quarter front view of the left and right hand side wheel support sub-assemblies of FIG. 9;

FIG. 9B is a left side view of the front view of the left and right hand side wheel support sub-assemblies of FIG. 9A;

FIG. 9C is a top view of the left side view of the left and right hand side wheel support sub-assemblies of FIG. 9B;

FIG. 10 is an exploded view of the three-quarter left front view of the left and right hand side wheel support sub-assemblies of FIG. 9;

FIG. 10A is a detail view of the area 10A of the exploded view of FIG. 10;

FIG. 10B is a detail view of the area 10B of the exploded view of FIG. 10; and

FIG. 10C is a detail view of the area 10C of the exploded view of FIG. 10.

DESCRIPTION OF THE PREFERRED EMBODIMENTS

Figure 2:
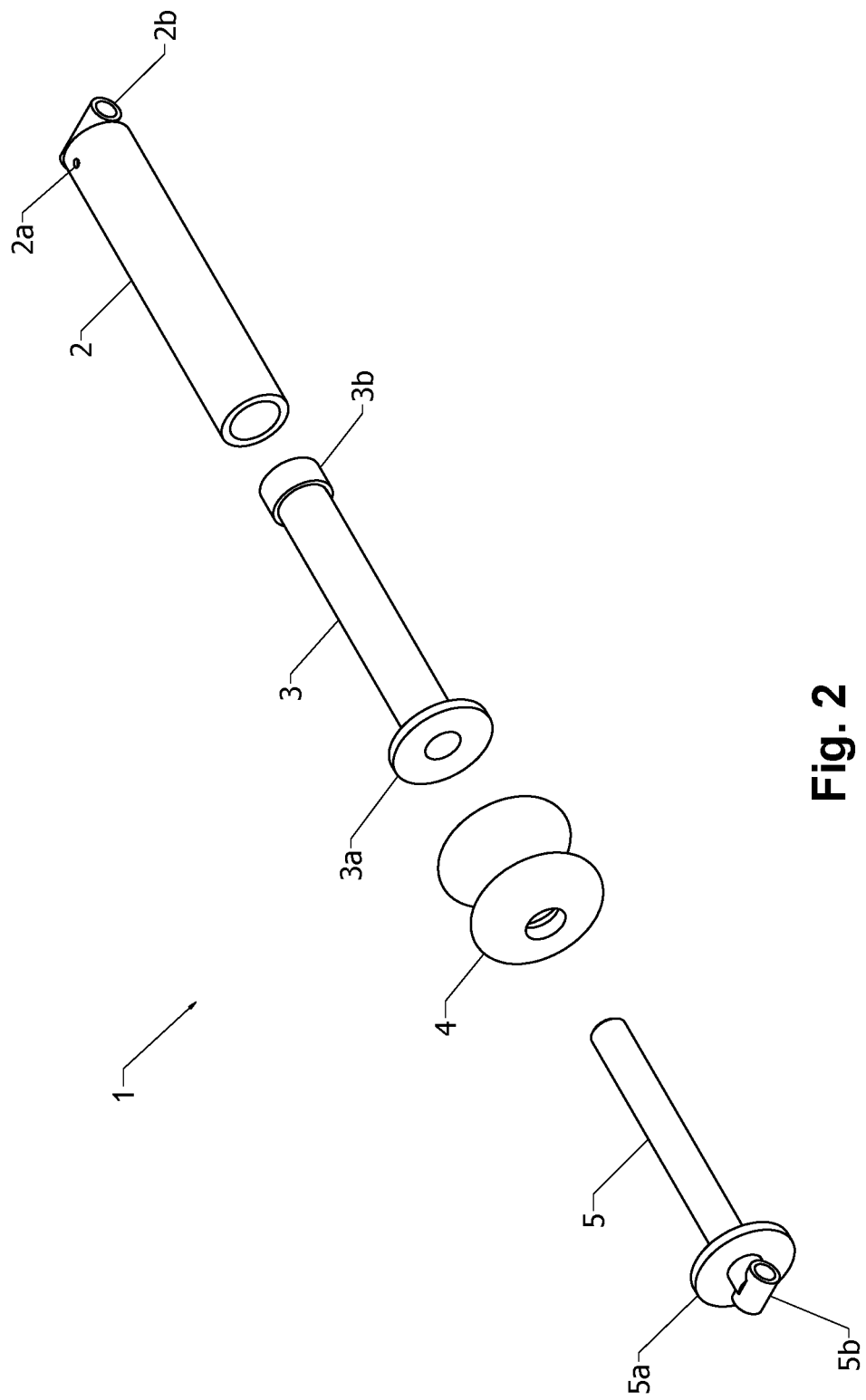
FIG. 2 is an exploded view of the hydraulically-adjustable elastomeric suspension unit assembly of FIGS. 1, 1A, 1B, 1C and 1D.

Referring now to the drawings and the illustrative embodiments depicted therein, a hydraulically-adjustable elastomeric suspension unit 1 in FIGS. 1, 1A, 1B, 1C, 1D, and 2, is generally comprised of a single-acting hydraulic cylinder body 2, a single-acting hydraulic ram-rod 3, an elastomeric (rubber) spring 4, and a suspension unit slide rod 5. Elastomeric spring 4 is generally concentrically disposed at and between suspension unit slide-rod 5 and slide rod spring seat 5a and ram-rod spring seat 3a of single-acting ram-rod 3. Cylinder body hydraulic fluid cavities 2c and 2d are filled and sealed with hydraulic fluid (oil) providing a substantially rigid and solid compressive connection between the single-acting hydraulic cylinder body 2 and the hydraulic ram-rod 3. Equalization of fluid pressure between the fluid cavities 2c and 2d is maintained by free fluid flow through ram-rod fluid port 3c which provides an opening between cylindrical cavity 2c and circumference-shaped cavity 2d. A fluid seal, which may comprise an O-ring, lip-wiper seal or any combination and series of sealing elements thereof, prevents the escape of pressurized hydraulic fluid from between the sliding concentric interface at ram-rod 3 and cylinder body 2 at internal stop collar 2e. The anticipated O-rings and seals are not shown at internal stop collar 2e. When a variable axial compression force is applied at cylinder body pivotal attachment bushing 2b along the longitudinal axis of elastomeric suspension unit 1, and with the opposite end suspension unit pivotal attachment bushing 5b at a fixed position or location, a compression reaction force and deflection of the elastomeric spring 4 occurs. In this way, the elastomeric suspension unit 1 works as both a sudden load-force shock absorber and an adjustable variable length load-supporting member along its longitudinal axis between pivotal attachment bushings 2b and 5b.

Therefore, the elastomeric suspension unit 1 of the present invention can be readily utilized to satisfy three useful vehicle suspension requirements at the same time: 1) as a primary load-supporting suspension member; 2) as a shock absorbing suspension member; and 3) as a variable-height-adjustable support suspension member for a potentially wide variety of foreseeable vehicle suspension applications and uses for example.

Although they may be provided in alternative embodiments, traditional shock absorbers are not required at each wheel suspension unit since the elastomeric rubber springs inherently provide a reasonable degree of damping of each wheel over rough roads and surfaces.

As shown in the following figures for example, two sixteen-inch diameter wheels are securely held to their respective wheel hubs by eight wheel studs and lug nuts. These wheels further include sixteen-inch pneumatic tubeless tires selected for the maximum suitable load capacity of the trailer and include a tire tread design suitable for both on-highway and rough terrain off-road use.

A particular benefit and usefulness of the present invention and the above-described vehicle suspension unit is that when the volume of hydraulic fluid (oil) that is contained and sealed within fluid cavities 2c and 2d is varied, the overall length of the suspension unit 1 is accordingly increased or decreased by the change in volume of the hydraulic fluid (oil) therein contained. This feature lends itself to the ability to readily change or vary the height of the suspension unit 1 by either supplying or withdrawing hydraulic fluid from the fluid cavities 2c and 2d.

Figure 3:
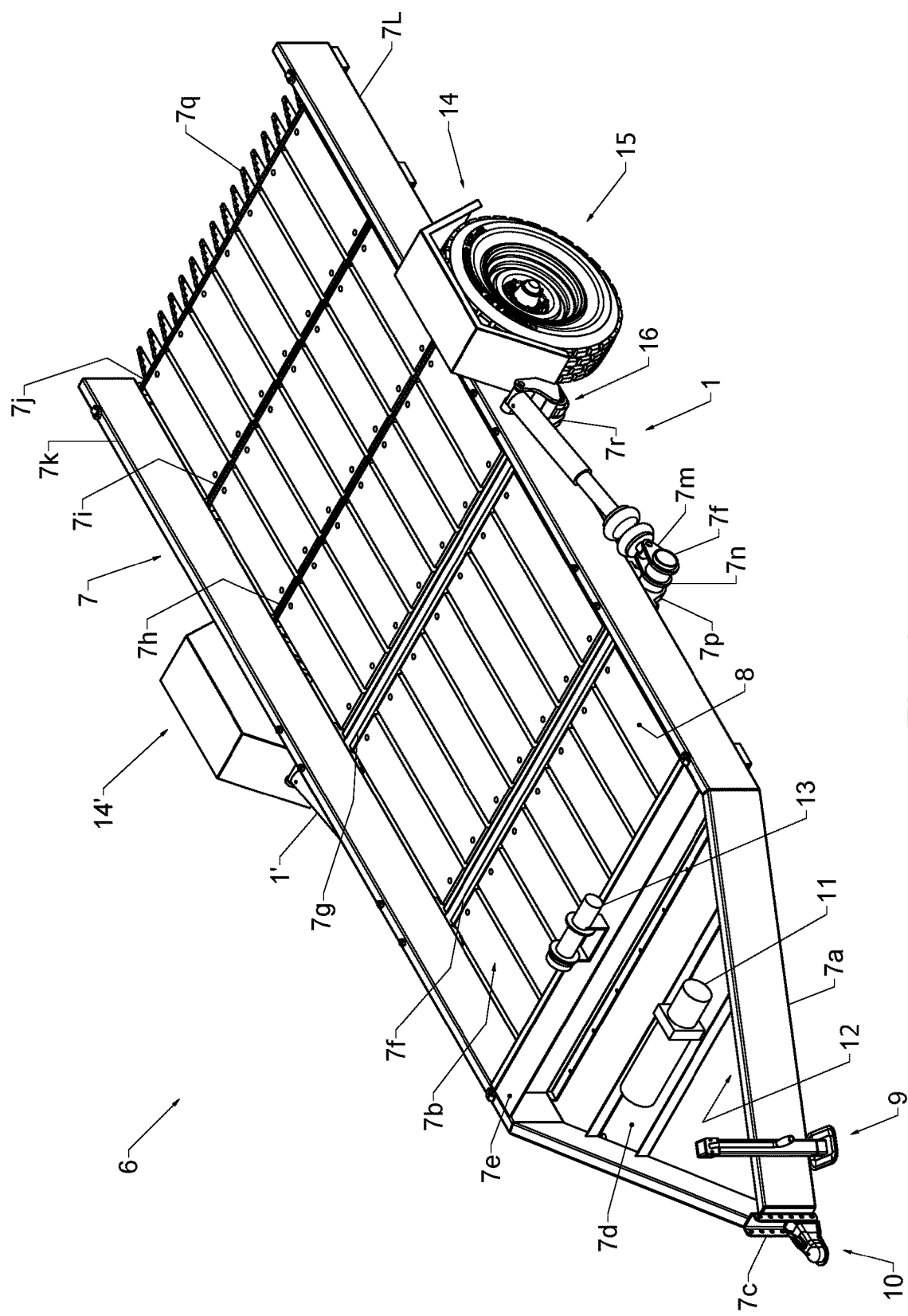
FIG. 3 is a three-quarter left-front perspective view of the tilt-bed utility trailer incorporating the hydraulically-adjustable elastomeric suspension unit assembly of the present invention.

Hydraulic fluid may be forced into or out of the respective cavities 2c and 2d through hydraulic fluid port 2a at hydraulic cylinder body 2. Pressurized hydraulic fluid may be provided for example by a small electrically-powered hydraulic pump unit or system as shown in FIG. 3. The small hydraulic system may be conveniently powered by a 12-volt power supply readily available for example on most road and off-highway vehicles. The small hydraulic system may further include a small fluid reservoir containing hydraulic fluid, a simple control valve for controlling the direction and flow of hydraulic fluid both to and from the suspension unit 1 through relatively small and simple fluid pressure lines and connections.

When suspension unit 1 is used as a primary supporting member on a vehicle or trailer suspension, it is then possible to readily change, adjust or maintain the desired ride height of the suspension by adjustment and control of the oil volume, which includes controlling the ride height of the vehicle as well. It should be understood that each wheel of a vehicle may utilize at least one elastomeric suspension unit 1. In the case of a 4-wheel vehicle, the elastomeric suspension unit 1 may be optionally utilized at only one end of the vehicle in pairs, either at the front or the rear suspension for example.

It should be understood that the ride-height adjustments accomplished by the volume change in hydraulic fluid is independent of the function, deflection and load capacity rating of the elastomeric spring 4. This is made possible by the concentric free-sliding linear degree of freedom engagement between the internal portion of hydraulic ram-rod 3 and the external portion of suspension unit slide rod 5. The open cylindrical cavity at slide rod end clearance 5c allows the suspension unit slide rod 5 to move toward the hydraulic ram-rod 3 whenever the elastomeric spring 4 is compressed either statically or dynamically under load.

The design requirements of the spring are expected to vary depending upon the vehicle application and would be generally pre-selected for the expected loads and operating conditions of the vehicle. At least one example of commercially available elastomeric rubber springs is Timbren Industries, Inc. of Whitby, Calif., USA.

Free movement of the sliding concentric surfaces between the ram-rod 3 and the slide rod 5 may be maintained by grease or other similar lubricant to reduce friction and reduce the chance of rust and corrosion should the components be comprised of steel for example. Additionally, low friction linear slide bearings may be optionally utilized within the design to help reduce reliance upon lubricants to ensure free movement and low friction and further help minimize the likelihood of excess wear from anticipated substantially continuous dynamic motion between the components. The preferred orientation of the hydraulically-adjustable elastomeric suspension unit 1 is to maintain the hydraulic cylinder body 2 substantially oriented at the top or otherwise at an incline to avoid the possibility of water and material contamination from naturally entering the internal portions of the unit due to gravity and provide at least some degree of self-drainage in instances should this happen to occur.

Free linear movement of slide rod 5 in the opposite or extension direction is not shown to be limited in the current embodiment and illustrations, however it is anticipated that various means to limit the extended direction of motion to prevent unwanted disengagement of slide-rod 5 from hydraulic ram-rod 3 may be anticipated. For example, a shouldered stop collar may be utilized at and between slide-rod 5 and hydraulic ram-rod 3 (not currently shown). Other internal stop mechanisms may be anticipated. Additionally, other external means stop means may be anticipated, including for example a flexible limiting strap, cable, chain or other forms of limiting stops included at or within other external members of the vehicle suspension system that may be utilized to accomplish this same purpose. These potentially anticipated potential features are not currently shown as they are likely to vary in design depending upon further development and the particular and actual application of the present invention.

FIGS. 3, 4, 4A, 5, 5A, 6, 7, 8 and 8A illustrate an example embodiment of the present invention related to and incorporated into a tilt-bed utility trailer 6. The main structural frame 7 of the tilt-bed trailer 1 is most readily shown in FIGS. 3, 4, 4A, 5, 5A, 6, 7, 8, and 8A. The main structural frame 7 is generally comprised of typical structural steel shapes and formed sheet metal, including angles, square tubing, and bar stock for example. Also included are subsections or areas of flat or otherwise bent and formed sheet metal, cut and sized appropriately for close-fitting structural strength of the final assembly. The main structural frame assembly 7 includes an extensive series of and a variety of welded joints to provide a secure and reliable level of design strength toward the accommodation of various anticipated design loads and intended uses.

The bed support surface 7b of the trailer main frame 7 comprises at least one wooden plank member 8, and in the illustrated embodiment 40, wooden plank members 8 are bolted and securely fastened to a series of trailer frame cross-support members at 7e, 7f, 7g, 7h, 7i and 7j, respectively. Other suitable materials may optionally be selected to provide the bed support surface 7b of the trailer. Frame cross-support members 7e, 7f, 7g, 7h, 7i and 7j may be either welded or bolted into place and supported by main frame rails 7k and 7L to form a substantially rigid and secure load-carrying tilt-bed trailer frame. A series of individual loading ramp support members 7q comprised of mild steel and welded to the trailer bed rear support cross member 7j help ease the transition between ground level and the bed support surface 7b of the trailer when heavy objects and materials must be slid onto or off of the deck of the trailer during loading or unloading.

The front portion of the trailer is comprised of the drawbar assembly 7a having the general shape of an A-frame and may be comprised of structural welded steel which is rigidly and securely welded to the forward end of the trailer main frame 7. The drawbar assembly 7a may also include a mechanical crank-operated trailer parking jack 9 for the purpose of supporting the trailer while it is being parked or otherwise separated from the tow vehicle.

The forward end of the drawbar assembly 7a includes a trailer hitch coupler assembly 10 that is securely fastened to a structural vertical member 7c having a vertical series of mounting holes to secure the hitch coupler assembly 10. This provides the option to correctly adjust the vertical height of the trailer hitch coupler assembly 10 to generally match the height of the tow vehicle trailer hitch (not shown) as needed to maintain the approximate proper degree of levelness of the trailer main frame 7 with respect to the ground. This adjustment helps to ensure for the proper operation of the tilt-bed utility trailer and its beneficial functions whenever different tow vehicles and trailer hitch heights are encountered.

Figure 6:
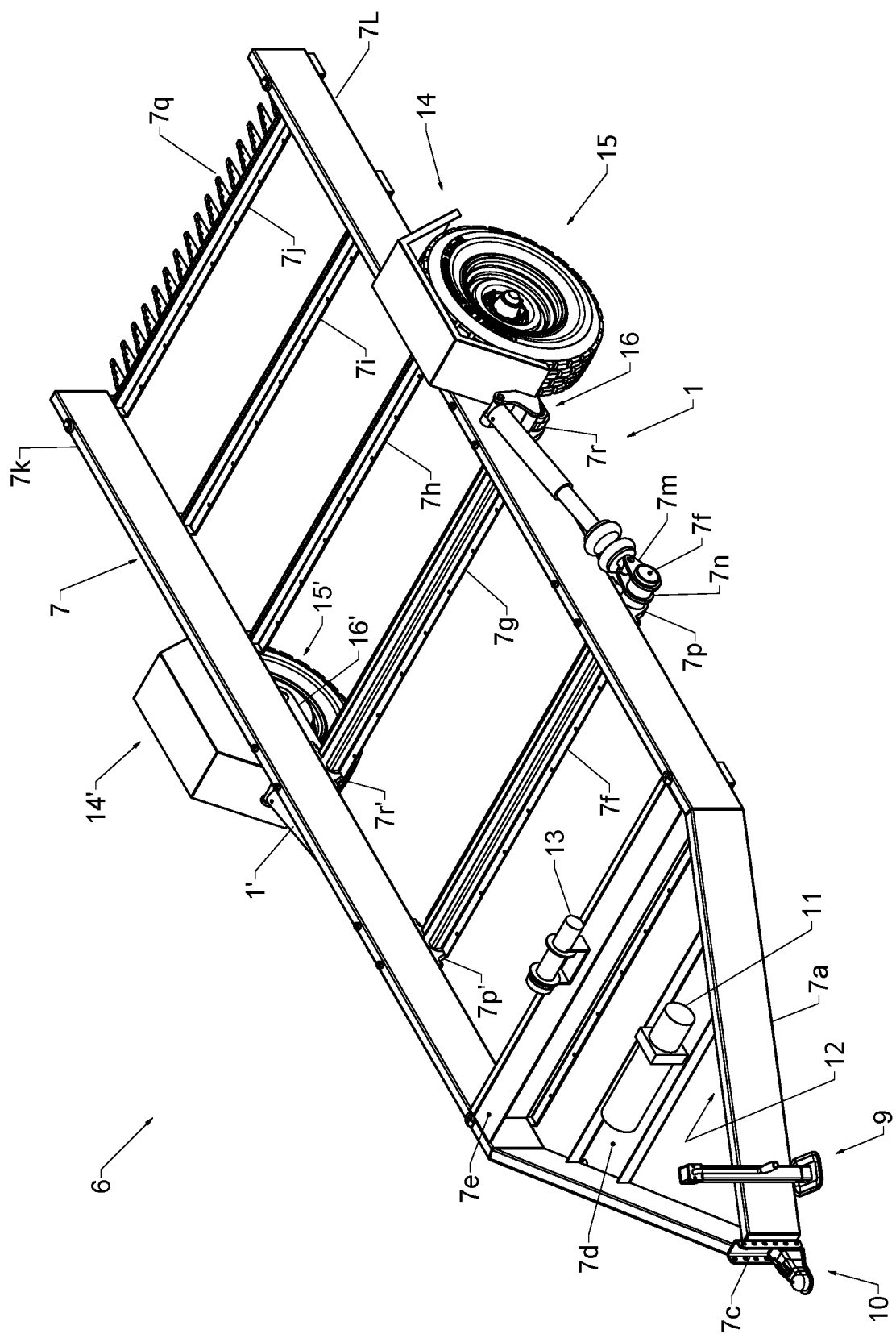
FIG. 6 is a three-quarter left-front perspective view of the tilt-bed utility trailer incorporating the hydraulically-adjustable elastomeric suspension unit assembly of the present invention without the deck support members shown to more clearly show the present invention.
Figure 7:
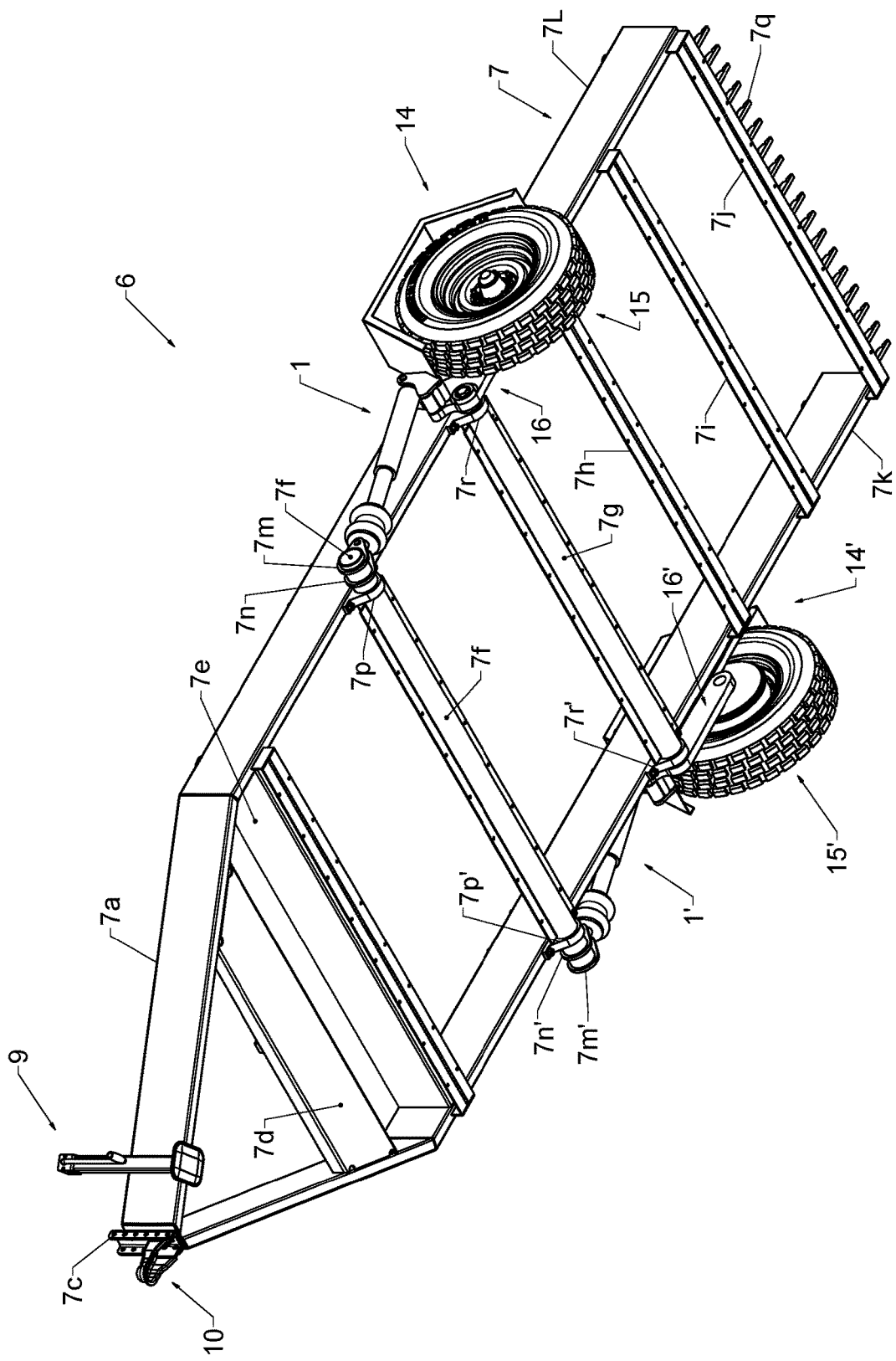
FIG. 7 is a three-quarter lower left-front perspective view of the tilt-bed utility trailer incorporating the hydraulically-adjustable elastomeric suspension unit assembly of the present invention shown in FIG. 6.

The mid-portion of the drawbar assembly 7a further includes cross-member 7d for added strength and a convenient mounting location for a small 12-volt electrically-powered hydraulic pump unit 11 as shown in FIGS. 3 and 6 for powered operation and adjustment of the suspension ride-height as previously described and as follows.

A weather-resistant electrical box 12 containing a commercially available trailer break-away safety device and other trailer electrical connections and wiring circuit terminals interface is also mounted to the inner portion of the drawbar assembly 7a. Other weather-resistant electrical accessory boxes may also be mounted to the inner portions of the drawbar assembly, as generally not shown in FIGS. 3, 6, and 7.

A weather-resistant documents holder or sealed container 13 is provided and mounted at the front main cross-member 7e. This is a water-proof container for holding various documents including for example operating instructions and registration documentation such that this information may generally and conveniently remain with the trailer at all times regardless of which particular vehicle may be used to tow the trailer in any given instance.

FIGS. 4, 4A, 5, 5A, 6, 7, 8, and 8A illustrate a left side view and perspective views of the present invention incorporating the hydraulically-adjustable elastomeric suspension units 1 and 1' with a left and right side pivoting wheel support members 14 and 14'. A pair of hydraulically-adjustable elastomeric suspension units 1 and 1' as previously described, are attached to the main frame 7 at trailer first bed support cross-member 7f by means of a pair of inner and outer mounting plates 7m, 7n, 7m' and 7n'. The respective cylinder body pivotal attachment bushing 2b of suspension unit 1 is held into place by a threaded fastener (not shown) placed through a hole at outer mounting plate 7m, cylinder body attachment bushing 2b, and through a hole at inner mounting plate 7n. The threaded fastener (not shown) is then secured by a corresponding threaded hex nut (not shown), thus providing a fixed and pivotal mounting point for suspension unit 1. It may be noted that the respective pairs of inner and outer mounting plates 7m, 7n, 7m', and 7n' are each securely welded to trailer first bed support cross-member 7f. Cross-member support 7f in the current embodiment is comprised of tubular structural steel, which extends from one side of the trailer frame 7 to the opposite side. Cross-member support 7f is securely attached to the main frame 7 at longitudinal frame rails 7k and 7L by a pair of pillow-block supports 7p and 7p' welded to the ends of cross-member support 7f. In the illustrated embodiment, the pillow-block supports 7p and 7p' are secured by threaded fasteners to the bottom face of longitudinal frame rails 7k and 7L. This arrangement provides a structurally secure mounting arrangement for the forward ends of both the hydraulically-adjustable elastomeric suspension units 1 and 1' while allowing for their free pivoting motion as required at the respective pivotal attachment bushings 2b at each unit.

Figure 4:
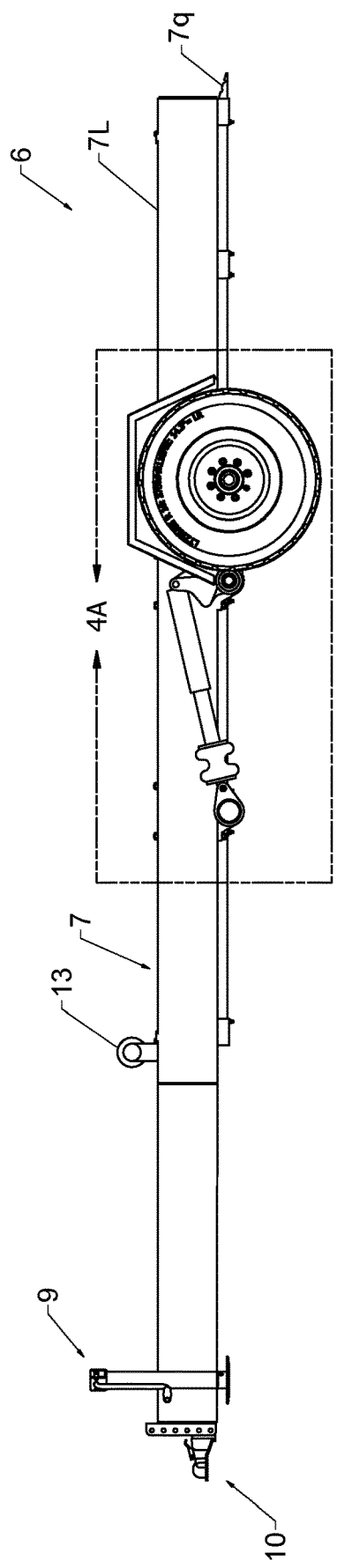
FIG. 4 is a left side view of the tilt-bed utility trailer of FIG. 3.
Figure 4A:
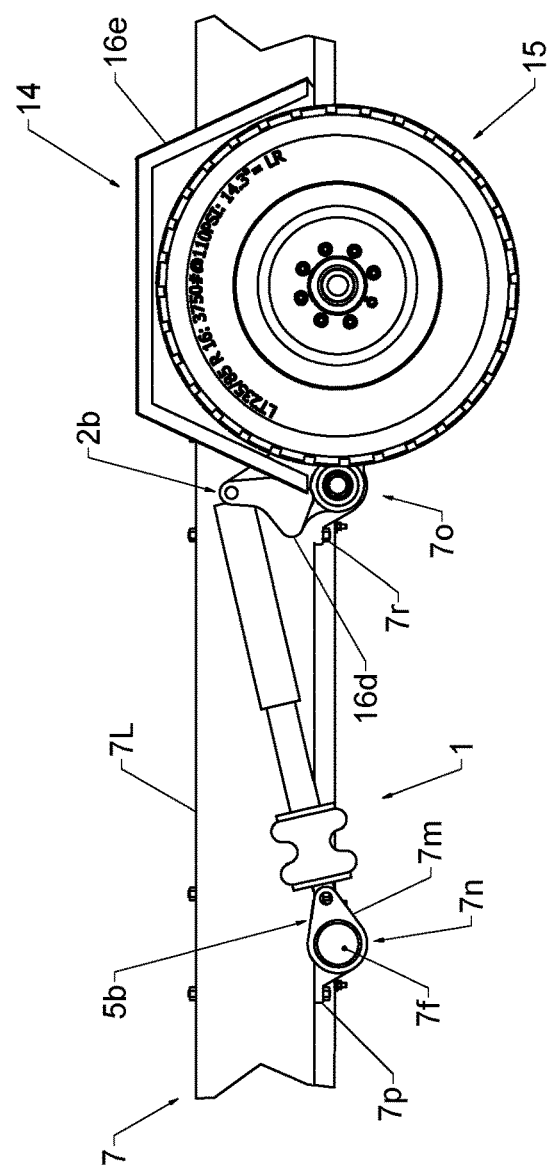
FIG. 4A is a detail view of the are 4A of FIG. 4, showing the hydraulically-adjustable elastomeric suspension unit assembly and pivotable wheel support member.

FIGS. 4 and 4A show the general arrangement of the pivoting wheel support member 14 with the main frame 7 and the elastomeric suspension unit 1. Pivoting wheel support member 14 comprises left support member welded assembly 16, defined by main pivoting arm member 16a, axle stub shaft 16b, main pivoting shaft member 16c, reaction arm 16d, and wheel splash fender 16e all securely welded together as a single unit. The pair of steel wheel fenders 16e and 16e' are secured by welding to each of the left and right support member welded assemblies 16 and 16'. These may be required for proper use on the highway and serve the useful and essential function of helping to protect against water splashes, mud, and debris from the tires during transport.

Figure 8:
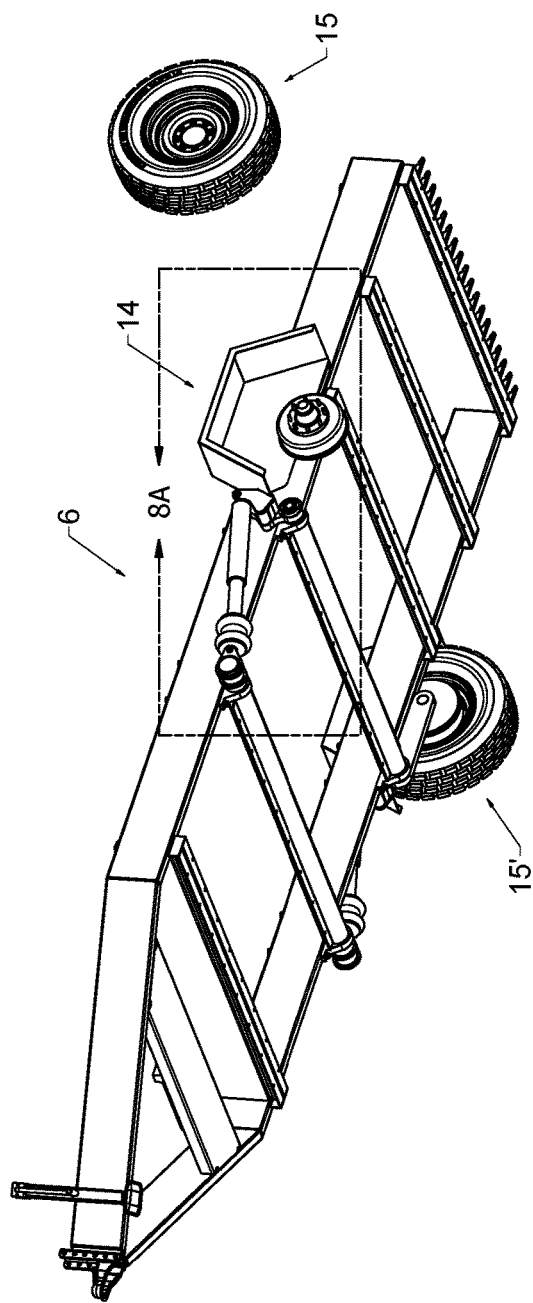
FIG. 8 is another lower left-front perspective view of the tilt-bed utility trailer of FIG. 7, shown with the wheel removed.
Figure 8A:
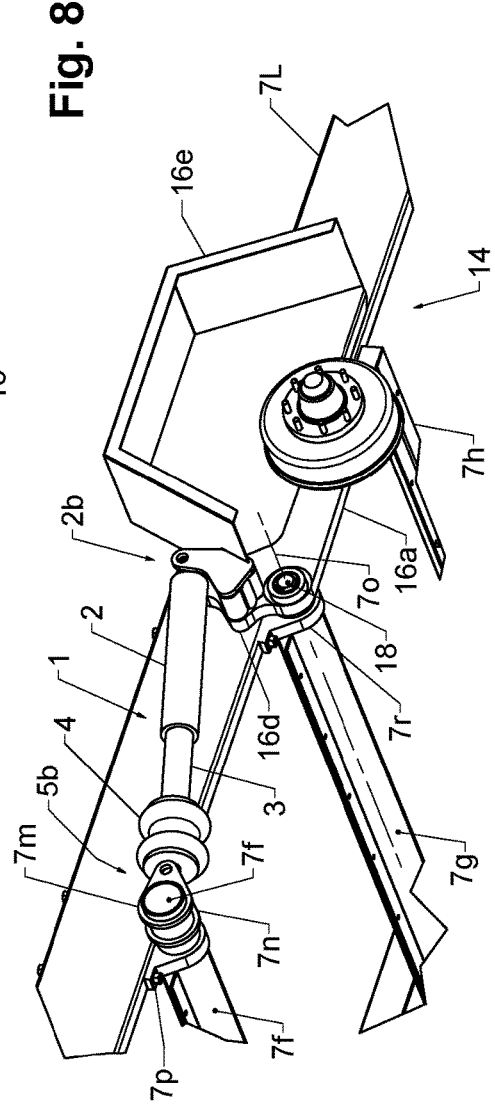
FIG. 8A is a detail view of the area 8A of FIG. 8, showing the lower left-front perspective view of the hydraulically-adjustable elastomeric suspension unit.

Welded assembly 16 thus supports the wheel and hub assembly 15 including wheel bearings, grease seals and an optional wheel brake assembly as may be provided (not shown). Welded assembly 16 is attached for pivotal freedom of movement at the main frame 7 at the second bed support cross-member 7g for pivotal movement about suspension lateral pivot axis 7o, as shown in FIG. 8A, which extends left to right substantially perpendicular to the longitudinal axis of the tilt-bed utility trailer 6.

Generally similar to the arrangement of the first trailer cross-member, the second bed support cross-member support 7g in the current embodiment is again comprised of tubular structural steel which extends from one side of the trailer frame 7 to the opposite side. Cross-member support 7g is securely attached to the main frame 7 at longitudinal frame rails 7k and 7L by a pair of pillow-block supports 7r and 7r' welded to the ends of cross-member support 7g. In the illustrated embodiment, the pillow-block supports 7r and 7r' are secured by threaded fasteners to the bottom face of longitudinal frame rails 7k and 7L. This arrangement provides a structurally secure mounting arrangement of the respective left and right wheel support member welded assemblies 16 and 16', while allowing for free pivoting motion of the pivoting wheel support members 14 and 14' at suspension pivot axis 7o as required for desired suspended wheel motion.

FIGS. 4, 4A, 5, 5A, further shows that the hydraulically-adjustable elastomeric suspension unit 1 is pivotally attached to the left pivoting wheel support member 14 at the upper portion of left reaction arm 16d of support member welded assembly 16 at cylinder body pivotal attachment bushing 2b. A threaded fastener and hex nut (not shown) is used to secure the pivotal connection between the suspension members. The same arrangement occurs at the right side of the trailer for the right pivoting wheel support assembly 14'.

Figure 5:
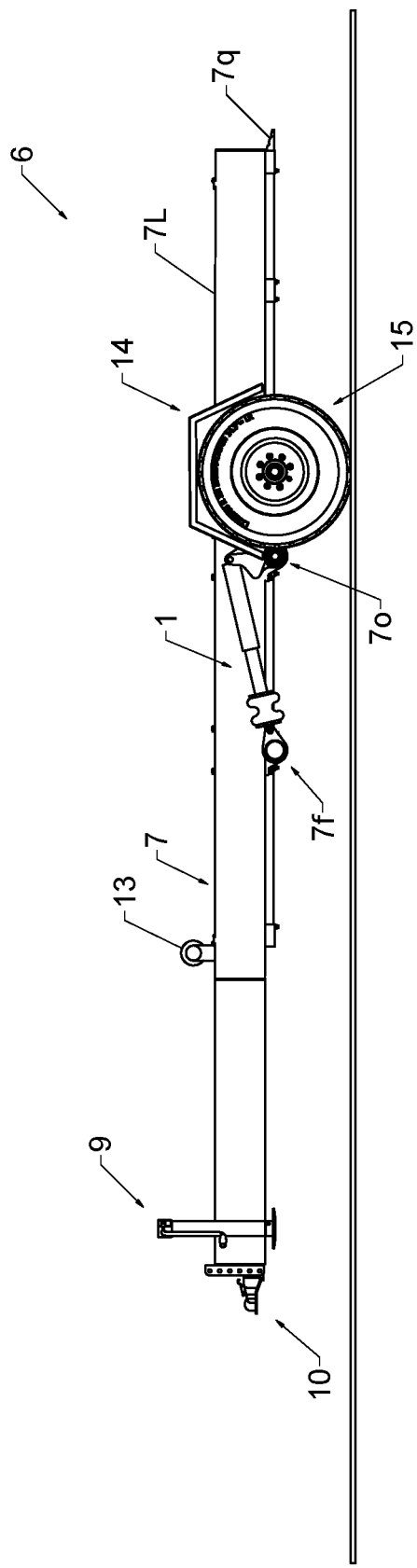
FIG. 5 is a left side view of the tilt-bed utility trailer of FIG. 3 with the trailer bed set at its normal ride-height position.
Figure 5A:
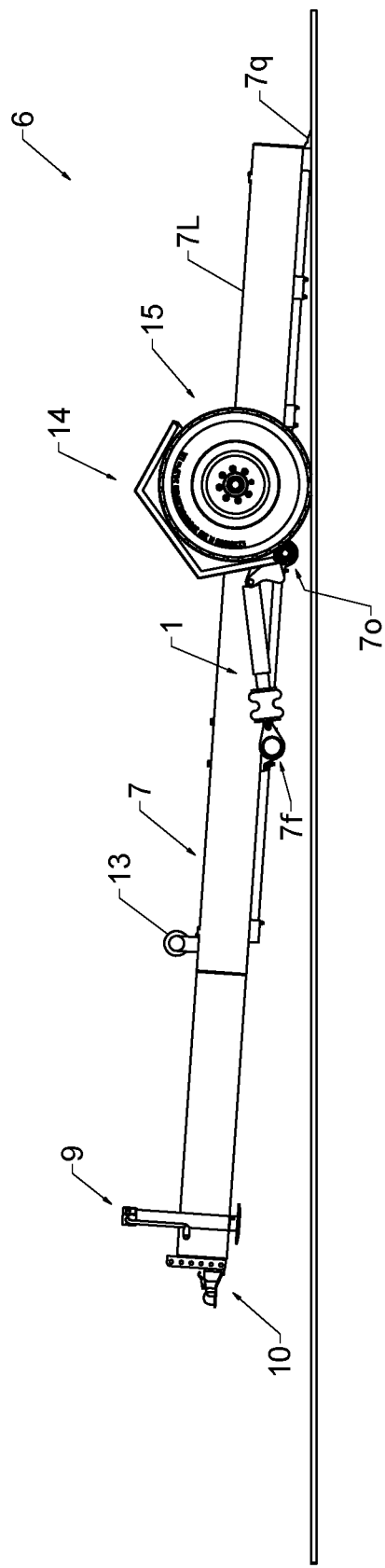
FIG. 5A is a left side view of the tilt-bed utility trailer of FIG. 5 with the trailer bed set at its tilted position with its rearward most end at ground level for ease of loading and unloading.

FIGS. 5 and 5A best illustrate the effective raising, tilting and lowering of the trailer when a volume of hydraulic fluid is controllably provided and released from both the hydraulically-adjustable elastomeric suspension units 1 and 1'. To raise the trailer, a supply of pressurized hydraulic fluid is provided by an electrically-powered hydraulic pump unit 11 mounted to the trailer frame 7 at drawbar cross-member 7d as shown in FIGS. 3 and 6. To lower the trailer, the fluid volume and pressure with the suspension units 1 and 1' is simply relieved and allowed to return back to a small non-pressurized fluid reservoir at electrically-powered hydraulic pump unit 11. In this case no electrical power is required, and the pressurized fluid is directed through a control valve (not shown) and through fluid supply lines and fittings (not shown) from the respective fluid ports 2a at suspension units 1 and 1'. Because of the single-acting design of the suspension units 1 and 1', only a single small diameter fluid line is necessary to direct hydraulic fluid both to and from each of the suspension units 1 and 1'. This feature provides the benefits of simplicity and reduced costs of manufacturing of the tilt-bed trailer 6.

Once the rearward most end of the trailer bed is brought down to ground level, the trailer 7 and bed support surface 7b is naturally tilted to within just a few degrees of sloped incline with respect to level ground, thus providing ease of loading and unloading of materials either onto of off of the trailer. This aspect including the relative simplicity of the hydraulically-adjustable elastomeric suspension units 1 and 1' and the pivoting wheel support members 14 and 14' are the key features that provide the primary benefits of the present invention.

As shown in greater detail in FIGS. 9, 9A, 9B, 9C, 10, 10A, 10B and 10C, the arrangement of the hydraulically-adjustable elastomeric suspension within this particular embodiment of the present invention provides for independent suspension action between the left and right wheels. For the sake of clarity, FIGS. 9, 9A, 9B, and 9C illustrate the installed sub-assembly of the left and right pivoting wheel support member welded assemblies 16 and 16' respectively without the main frame 7 or the wheel and hub assemblies 15 and 15'. It should be noted that the left and right main pivoting shaft members 16c and 16c' are normally constrained at the trailer main frame within the second bed support cross-member 7g for pivotal freedom of movement at suspension pivot axis 7o as shown in FIG. 8A. In this embodiment second bed support cross-member 7g is comprised of hollow round structural steel tubing, however steel pipe can also be utilized.

FIG. 10 shows in exploded view format the mechanical interface between the left and right pivoting wheel support assemblies 16 and 16'. Lateral retaining shaft 17 includes internally threaded ends 17a and 17a' for engagement of respective left and right suspension pivot retaining fasteners 18 and 18' which may be typical hex head threaded fasteners. Flat retaining left and right thrust washers 19 and 19' are also provided. Lateral retaining shaft 17 is located generally concentric to and within the left and right main pivoting shaft members 16c and 16c' of wheel support welded assembly members 16 and 16'. Once assembled, the externally tapered end portion 16f of the left main pivoting shaft member 16c engages with the internally tapered bore portion of 16g of right main pivoting shaft member 16c'. Light grease or other lubricant may be applied to these tapered surfaces prior to final assembly to further reduce friction and wear. In this way, light frictional pivotal contact and mutual support is established between the respective left and right wheel support member welded assemblies 16 and 16'. This mutual support is in addition to their respective points of pivotal support at the respective outer end portions of the second bed support cross-member 7g at pivot axis 70. This arrangement provides a simple and effective means of independent pivotal support of the respective wheel support members 14 and 14' and the wheels of the tilt-bed trailer.

In an alternative embodiment, a live-bed flexible member spans the upper support surface. This alternative embodiment is described in U.S. Publication No. US-2017-0008441, which is hereby incorporated herein by reference in its entirety, such that a complete and detailed review and description of this embodiment need not be included herein.

Briefly, this alternate embodiment includes a live-bed flexible member spanning the upper support surface of the utility trailer bed and further includes a set of load chains that span below the bed panel and are coupled between forward and rearward ends of the live-bed flexible member. A drive system may engage the load chains and is operable to drive the live-bed flexible member in forward and rearward directions over the upper support surface (trailer bed) for loading and unloading items from the utility trailer. The utility trailer of the present invention provides a unique combination of simplicity, reasonably low cost to manufacture, and ease-of-use self-loading, transport and self-unloading capabilities. Optionally, the alternate embodiment utility trailer may include a bulkhead assembly that is coupled between the forward end of the live-bed flexible member and a rear end of the load chains to define a mechanical loop that is driven by the drive system to move the bulkhead assembly with the live-bed flexible member.

Optionally, the alternate embodiment utility trailer may include a drawbar assembly that is pivotally coupled with a front end of the trailer frame about a horizontal axis, such that a linear adjustment device may be coupled between the drawbar assembly and the trailer frame and linearly actuated to adjust the angle of the drawbar assembly relative to the trailer frame for adjusting a height of a rear of the trailer frame from a ground surface.

Changes and modifications in the specifically described embodiments may be carried out without departing from the principles of the present invention, which is intended to be limited only by the scope of the appended claims as interpreted according to the principles of patent law.

The invention claimed is:

1. A suspension system for a vehicle, said suspension system comprising:
    an extendable and retractable actuator disposed at each side of a frame of the vehicle and pivotally attached at one end to a vehicle bracket and at the other end to a suspension bracket;
    wherein said suspension bracket comprises an actuator portion, an axle portion and a suspension arm, and wherein said actuator portion and said suspension arm are pivotable relative to an axis of said axle portion;
    wherein a wheel is mounted to an end of said suspension arm distal from said axle portion;
    wherein, when said actuator is extended or retracted, said actuator portion pivots about said axis of said axle portion, and wherein pivotal movement of said actuator portion about said axis imparts pivotal movement of said suspension arm about said axis to adjust a height of the frame of the vehicle relative to the ground;
    wherein said actuator comprises a cylinder, a ram rod movably disposed in said cylinder, and a slide rod movably disposed in said ram rod;
    wherein said actuator comprises an elastomeric element disposed between an outer end of said slide rod and an outer end of said ram rod; and
    wherein said slide rod is movable relative to said ram rod and said cylinder to absorb sudden movements of the frame or wheel.

2. The suspension system of claim 1, wherein the vehicle comprises a trailer.

3. The suspension system of claim 1, wherein said actuator is operable to move said ram rod relative to said cylinder responsive to pressurized hydraulic fluid.

4. The suspension system of claim 3, wherein pressurized fluid is provided at said cylinder to extend said ram rod relative to said cylinder, and wherein pressure is reduced to allow said ram rod to retract relative to said cylinder.

5. The suspension system of claim 1, wherein said elastomeric element is compressible to allow said slide rod to move inward relative to said ram rod, and wherein said elastomeric element biases said slide rod towards an extended position relative to said ram rod.

6. The suspension system of claim 5, wherein said elastomeric element is disposed between and engages a flange at an outer end of said ram rod and a flange at an outer end of said slide rod.

7. The suspension system of claim 1, wherein the one end of said actuator that is pivotally attached to said vehicle bracket comprises one of an end of said cylinder or an end of said ram rod, and wherein the other end of said actuator that is pivotally attached to said suspension bracket comprises the other of an end of said cylinder or an end of said ram rod.

8. The suspension system of claim 1, wherein said axle portion of said suspension bracket is pivotally mounted at the vehicle and extends across a width of the frame of the vehicle, and wherein an actuator portion and a suspension arm are disposed at each end of said axle portion.

9. The suspension system of claim 1, wherein said vehicle bracket includes an axle portion that is pivotally mounted at the frame of the vehicle.

10. The suspension system of claim 9, wherein said axle portion of said vehicle bracket extends across a width of the frame of the vehicle, and wherein one end of a respective actuator is attached at each end of said axle portion of said vehicle bracket.

11. A suspension system for a vehicle, said suspension system comprising:
    an extendable and retractable actuator disposed at each side of a frame of the vehicle, said actuator comprising a cylinder, a ram rod movably disposed in said cylinder, and a slide rod movably disposed in said ram rod;
    wherein said actuator comprises an elastomeric element disposed between an outer end of said slide rod and an outer end of said ram rod;
    wherein said elastomeric element is compressible to allow said slide rod to move inward relative to said ram rod, and wherein said elastomeric element biases said slide rod towards an extended position relative to said ram rod;
    a suspension bracket is disposed at each side of a frame of the vehicle, wherein said suspension bracket comprises an actuator portion, an axle portion and a suspension arm, and wherein said actuator portion and said suspension arm are pivotable relative to an axis of said axle portion, and wherein a wheel is mounted to an end of said suspension arm distal from said axle portion;
    a vehicle bracket is disposed at each side of the frame of the vehicle and spaced from said suspension bracket at the respective side of the frame of the vehicle;
    wherein a first end of said actuator is pivotally attached at said vehicle bracket and a second end of said actuator is pivotally attached at said actuator portion of said suspension bracket;
    wherein, when said actuator is extended or retracted, said actuator portion pivots about said axis of said axle portion, and wherein pivotal movement of said actuator portion about said axis imparts pivotal movement of said suspension arm about said axis to adjust the wheel relative to the frame of the vehicle so as to adjust a height of the frame of the vehicle relative to the ground; and wherein said slide rod is movable relative to said ram rod and said cylinder and, responsive to sudden movement of the wheel relative to the frame, compresses said elastomeric element to absorb sudden movements of the wheel relative to the frame.

12. The suspension system of claim 11, wherein the vehicle comprises a trailer.

13. The suspension system of claim 11, wherein said actuator is operable to move said ram rod relative to said cylinder responsive to pressurized hydraulic fluid.

14. The suspension system of claim 13, wherein pressurized fluid is provided at said cylinder to extend said ram rod relative to said cylinder, and wherein pressure of the fluid at said cylinder is reduced to allow said ram rod to retract relative to said cylinder.

15. The suspension system of claim 11, wherein said elastomeric element is disposed between and engages a flange at an outer end of said ram rod and a flange at an outer end of said slide rod.

16. The suspension system of claim 11, wherein said first end of said actuator comprises one of an end of said cylinder or an end of said ram rod, and wherein said second end of said actuator comprises the other of an end of said cylinder or an end of said ram rod.

17. The suspension system of claim 11, wherein said axle portion of said suspension bracket is pivotally mounted at the vehicle and extends across a width of the frame of the vehicle, and wherein an actuator portion and a suspension arm are disposed at each end of said axle portion.

18. The suspension system of claim 11, wherein said vehicle bracket includes an axle portion that is pivotally mounted at the frame of the vehicle.

19. The suspension system of claim 18, wherein said axle portion of said vehicle bracket extends across a width of the frame of the vehicle, and wherein said first end of said actuator is attached at a respective end of said axle portion of said vehicle bracket.

* * * * *

UNITED STATES PATENT AND TRADEMARK OFFICE
CERTIFICATE OF CORRECTION

| | | |
|---|---|---|
| PATENT NO. | : 10,596,948 B2 | Page 1 of 1 |
| APPLICATION NO. | : 15/689272 | |
| DATED | : March 24, 2020 | |
| INVENTOR(S) | : Philip J. Quenzi | |

It is certified that error appears in the above-identified patent and that said Letters Patent is hereby corrected as shown below:

In the Specification

<u>Column 8</u>
Line 60, "axis 70" should be --axis 7o--

Signed and Sealed this
Twenty-first Day of April, 2020

Andrei Iancu
*Director of the United States Patent and Trademark Office*